US010613218B2

United States Patent
Ichinose et al.

(10) Patent No.: US 10,613,218 B2
(45) Date of Patent: Apr. 7, 2020

(54) OBSTACLE DETECTION SYSTEM AND TRANSPORTATION VEHICLE

(71) Applicant: HITACHI CONSTRUCTION MACHINERY CO., LTD., Tokyo (JP)

(72) Inventors: Masanori Ichinose, Tokyo (JP); Takayuki Satou, Tsuchiura (JP); Hidefumi Ishimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 538 days.

(21) Appl. No.: 15/329,337

(22) PCT Filed: Mar. 3, 2015

(86) PCT No.: PCT/JP2015/056264
§ 371 (c)(1),
(2) Date: Jan. 26, 2017

(87) PCT Pub. No.: WO2016/035357
PCT Pub. Date: Mar. 10, 2016

(65) Prior Publication Data
US 2017/0229019 A1  Aug. 10, 2017

(30) Foreign Application Priority Data
Sep. 4, 2014  (JP) ................................. 2014-180459

(51) Int. Cl.
*G01S 13/931* (2020.01)
*G01S 7/41* (2006.01)
(Continued)

(52) U.S. Cl.
CPC ............. *G01S 13/931* (2013.01); *G01S 7/411* (2013.01); *G01S 13/08* (2013.01); *G01S 13/878* (2013.01);
(Continued)

(58) Field of Classification Search
CPC ........ G08G 1/166; G08G 1/168; G01S 13/08; G01S 7/41–411; G01S 13/931;
(Continued)

(56) References Cited

U.S. PATENT DOCUMENTS

| | | | | |
|---|---|---|---|---|
| 3,716,833 A | * | 2/1973 | Roth | ....................... G01S 17/87 340/556 |
| 5,587,929 A | * | 12/1996 | League | ................. G01S 13/726 342/118 |
| 5,668,739 A | * | 9/1997 | League | ................. G01S 13/726 342/118 |
| 6,055,042 A | * | 4/2000 | Sarangapani | ........... G01S 13/87 180/167 |

(Continued)

FOREIGN PATENT DOCUMENTS

| JP | 11-161900 A | 6/1999 |
|---|---|---|
| JP | 2013-196051 A | 9/2013 |

OTHER PUBLICATIONS

International Search Report of PCT/JP2015/056264 dated May 26, 2015.

*Primary Examiner* — Matthew M Barker
(74) *Attorney, Agent, or Firm* — Mattingly & Malur, PC

(57) ABSTRACT

When large vehicles and small vehicles travel together in a mine, they are distinguishably detected. On a haulage vehicle for a mine, a first obstacle detection device and a second obstacle detection device are disposed. The obstacle detection devices are disposed so that they have detection directions oriented in a same direction in horizontal planes, respectively. The first obstacle detection device 111 is disposed at a height where it can detect each small vehicle, while the second obstacle detection device 112 is disposed at a height where it can detect each large vehicle without detection of any small vehicle. On the basis of detection results of the first obstacle detection device 111 and second obstacle detection device 112, a detection processing device 120 determines whether an object is a small vehicle or a large vehicle.

6 Claims, 14 Drawing Sheets

(51) Int. Cl.
  *G01S 13/87* (2006.01)
  *G01S 13/08* (2006.01)
  *G08G 1/16* (2006.01)
  *G05D 1/02* (2020.01)
  *G01S 13/72* (2006.01)

(52) U.S. Cl.
  CPC ........... *G05D 1/0257* (2013.01); *G08G 1/166* (2013.01); *G08G 1/168* (2013.01); *G01S 13/726* (2013.01); *G01S 2013/93271* (2020.01); *G01S 2013/93273* (2020.01)

(58) Field of Classification Search
  CPC ................ G01S 13/878; G01S 13/726; G01S 2013/9382; G01S 2013/9375; G01S 2013/93271; G01S 2013/93273; G05D 1/0257; G05D 2201/0202
  See application file for complete search history.

(56) References Cited

U.S. PATENT DOCUMENTS

| | | | | |
|---|---|---|---|---|
| 7,877,209 | B2 * | 1/2011 | Harris | B60R 9/04 318/445 |
| 8,280,621 | B2 * | 10/2012 | Edwards | G01S 7/062 340/435 |
| 8,423,280 | B2 * | 4/2013 | Edwards | G01S 7/062 340/435 |
| 9,291,709 | B2 * | 3/2016 | Mitsuta | B60R 1/00 |
| 10,031,224 | B2 * | 7/2018 | Aoki | G01S 13/931 |
| 2005/0073433 | A1 * | 4/2005 | Gunderson | B60Q 9/006 340/903 |
| 2008/0266167 | A1 * | 10/2008 | Baumann | G01S 13/87 342/52 |
| 2010/0076708 | A1 | 3/2010 | Hukkeri et al. | |
| 2012/0271504 | A1 * | 10/2012 | Reiners | E02F 9/2054 701/29.1 |

* cited by examiner

FIG. 9

| VEHICLE TYPE | HEIGHT |
|---|---|
| VEHICLE TYPE 1 | h1 |
| VEHICLE TYPE 2 | h2 |
| VEHICLE TYPE 3 | h3 |

900

OBSTACLE DETECTION SYSTEM AND TRANSPORTATION VEHICLE

TECHNICAL FIELD

This invention relates to an obstacle detection system and a haulage vehicle, and especially to a monitoring technology for an obstacle in surroundings of a haulage vehicle that travels in a mine.

BACKGROUND ART

A large dump truck that travels in a mine has a width (for example, 9 m or so) and a height (for example, 7 m or so) far greater than general trucks and buses. Further, a cab in which the operator sits is arranged on an upper deck located in a front section of the dump truck. Therefore, a small vehicle that exists at a relatively near distance from the operator may enter a blind spot zone and may be hardly visible, and further, it may become difficult to grasp a sense of distance to a preceding vehicle due to a difference in height from the preceding vehicle. Technologies have hence been proposed to mount radar sensors on a mining dump truck for the detection of an obstacle.

As one of the above-described technologies, Patent Document 1 discloses a configuration that plural radar sensors of different detection areas and characteristics are mounted on a dump truck, the same single point is measured with these radar sensors, and a calibration is conducted to improve the accuracy of distance measurement.

PRIOR ART DOCUMENT

Patent Document

Patent Document 1: US 2010/0076708 A1

DISCLOSURE OF THE INVENTION

Problem to be Solved by the Invention

In a mine, small vehicles, such as light vehicles (for supervision or transportation of employees, etc.) and sprinkler vehicles, and large vehicles, such as dump trucks, may travel together on a haul road. Dump trucks each travel through a parking space, a loading site and a dumping site in accordance with an order and speed limits determined beforehand under traffic control, so that the risk of interference among dump trucks themselves, especially among dump trucks themselves which are traveling in the same advancing direction is not high in general.

In contrast, a small vehicle, with a safety supervisor or the like sitting therein, may travel in a direction approaching toward dump trucks to confirm the safety of surroundings of the vehicle and the haul road, so that the dump trucks and the small vehicle may become inconsistent in the traveling direction. Further, the small vehicle and the dump trucks are different in dynamic performance such as turning performance, braking performance and acceleration performance, and therefore are different in behavior. In addition, the small vehicle may not be a subject of traffic control, so that the risk of interference between the small vehicle and the dump trucks tends to become greater compared with the risk of interference between the dump trucks themselves. There is, accordingly, a desire to detect the small vehicle by distinguishing it from the dump trucks.

In this respect, Patent Document 1 cannot meet the above-described desire, because no consideration is made about distinguishably detecting a large vehicle and a small vehicle although it can improve the accuracy of a measurement upon obtaining data on a distance to an obstacle, for example, a preceding vehicle by using plural radar sensors of different characteristics.

With the foregoing in view, the present invention has as objects thereof the provision of an obstacle detection system and a haulage vehicle, which can distinguishably detect large vehicles and small vehicles when the large vehicles and small vehicles travel together in a mine.

Means for Solving the Problem

The present invention is characterized by an obstacle detection system to be mounted on a haulage vehicle for a mine. The obstacle detection system includes a first obstacle detection device disposed on the haulage vehicle and configured to measure a distance to an object, a second obstacle detection device configured to measure a distance to the object, said second obstacle detection device being disposed on the haulage vehicle at a location higher than a location at which the first obstacle detection device is disposed, a determination processing unit programmed to determine, on a basis of detection results of the first obstacle detection device and the second obstacle detection device, whether the object is a small vehicle with a relatively small body frame or is a large vehicle with a relatively large body frame, and an output processing unit programmed to externally output results of the determination. The first obstacle detection device and the second obstacle detection device are disposed at different heights on the haulage vehicle so that the first obstacle detection device and the second obstacle detection device have detection directions oriented in a same direction in horizontal planes, respectively, and have detection areas not overlapping each other in a vertical plane in a target distance determination range from the haulage vehicle, in which the large vehicle and the small vehicle are desired to be distinguishably determined. The determination processing unit determines the object to be the large vehicle when the second obstacle detection device has also detected the object in an allowable range in which a same vehicle can be regarded to have been detected at different detection points set by using, as a reference, a detection point where the first obstacle detection device has detected the object, and determines the object to be the small vehicle when the second obstacle detection device has not detected the object in the allowable range set by using, as the reference, the detection point where the first obstacle detection device has detected the object.

According to the above-described obstacle detection system, the respective detection areas of the first obstacle detection device and second obstacle detection device do not overlap in the vertical plane, in other words, in the height direction in the target distance determination range. When only the first obstacle detection device has detected the object, the height of an object can, therefore, be considered to be lower than the height of the detection area of the second obstacle detection device. Consequently, the determination processing unit can determine the object to be a small vehicle. When the first obstacle detection device and second obstacle detection device have both detected an object, on the other hand, the height of the object can be considered to extend from the height of the detection area of the first obstacle detection device to the height of the detection area of the second obstacle detection device, and therefore the determination processing unit can determine the object to be a large vehicle. Consequently, the large vehicle and small vehicle can be distinguishably determined. The output processing unit then externally outputs the determination results, thereby enabling to perform operation of the haulage vehicle depending on small vehicles and large vehicles.

The present invention may also be characterized in that in the above-described configuration, the second obstacle detection device is disposed on the haulage vehicle with an angle of elevation relative to the corresponding horizontal plane.

Consequently, compared with the case that the first obstacle detection device and second obstacle detection device are changed only in the heights of the disposed locations, the second obstacle detection device can be more assuredly and easily disposed such that the detection area of the second obstacle detection device does not overlap that of the first obstacle detection device.

The present invention may also be characterized in that in the above-described configuration, the second obstacle detection device comprises a sensor configured to emit a detection beam and to receive a reflection wave, which has been generated as a result of hitting of the object with the detection beam, thereby measuring the distance to the object, and the detection beam of the second obstacle detection device has a radiation width in an up-and-down direction, and the second obstacle detection device is disposed on the haulage vehicle with the angle of elevation so that the detection beam has a lower-limit radiation line extending in parallel to the corresponding horizontal plane.

Consequently, despite the second obstacle detection device that uses the detection beam having the radiation width in the up-and-down direction, the second obstacle detection device can be disposed such that the lower-limit radiation line of the detection beam does not overlap the detection area of the first obstacle detection device.

The present invention may also be characterized in that in the above-described configuration, the obstacle detection system further comprises an elevation angle changing mechanism configured to change the angle of elevation of the second obstacle detection device, and a drive controller configured to output an elevation angle changing instruction signal to the elevation angle changing mechanism.

Consequently, the angle of elevation of the second obstacle detection device can be adaptively changed. By increasing the angle of elevation, for example, according to the road gradient, the detection area of the second obstacle detection device can, therefore, be positioned farther on an upward gradient, thereby enabling to reduce the effect of an environment at the time of detection on the accuracy of the detection.

The present invention may also be characterized in that in the above-described configuration, the obstacle detection system further comprises a vehicle type information storage unit configured to store vehicle type information in which types and heights of vehicles, each of which can become a target to be detected as the object, are correlated with each other, wherein the determination processing unit is programmed to compare the detection results of the first and second obstacle detection devices and to determine the vehicle type of the object.

Consequently, it is possible not only to distinguish large vehicles and small vehicles from each other but also to determine their vehicle types. It is, therefore, possible to perform operational control of the haulage vehicle depending on the type of each detected vehicle. For example, when a light vehicle and a sprinkler vehicle, which use four-wheeled vehicles, are included in the small vehicles, the light vehicle has higher dynamic performance than the sprinkler vehicle so that the light vehicle may perform a sudden stop or a sudden turn. The haulage vehicle can, therefore, take an earlier response such that it begins a preparation for an interference avoidance maneuver.

The present invention is also characterized by a haulage vehicle configured to travel in a mine. The haulage vehicle includes a first obstacle detection device disposed at a first location and configured to measure a distance to an object, and a second obstacle detection device disposed at a second location higher than the first location and configured to measure a distance to the object. The first and second obstacle detection devices are each disposed to have detection directions oriented in a same direction in horizontal planes, respectively. The first location is a location where, of a small vehicle and large vehicle each of which is detectable as the object, the small vehicle is detectable, and the second location is a location where only the large vehicle is detectable.

Consequently, upon detecting, with plural obstacle detection devices, an object located in surroundings of the haulage vehicle, the determination of the height of the obstacle can be easily performed by using the difference in disposed height between the respective obstacle detection devices. Further, the use of this height makes it possible to distinguish whether the object is a small vehicle or a large vehicle.

Advantageous Effects of the Invention

According to the present invention, it is possible to provide an obstacle detection system and a haulage vehicle, which can distinguishably detect large vehicles and small vehicles when the large vehicles and small vehicles travel together in a mine. Objects, configurations and advantageous effects other than those described above will become apparent from the description of the following embodiments.

BRIEF DESCRIPTION OF THE DRAWINGS

FIGS. 5A and 5B are diagrams illustrating an example of grouping processing, in which FIG. 5A illustrates positions of an object on a horizontal plane and FIG. 5B illustrates positions of the object in a vertical plane.

FIG. 9 is a table showing vehicle type information to be stored in a vehicle type information storage unit.

MODES FOR CARRYING OUT THE INVENTION

Embodiments of the present invention will hereinafter be described using the drawings. With reference to the drawings, a description will hereinafter be made about the embodiments of the present invention. In the following embodiments, a description will be made by dividing each embodiment into plural sections or embodiments wherever needed for the sake of convenience. When the numbers of elements and the like (including the numbers of parts or components, numerical values, amounts, ranges, and so on) are referred to in the following embodiments, they shall not be limited to any specific numbers and may be greater or smaller than such specific numbers unless specifically indicated or unless apparently limited to such specific numbers in principle. In the following embodiments, their constituent elements (including processing steps and the like) are not absolutely essential unless specifically indicated or unless clearly considered to be essential in principle.

Further, the individual configurations, functions, processing units, processing means and the like in the following embodiments may be partly or wholly realized, for example, as integrated circuits or other hardware. Alternatively, the below-described individual configurations, functions, processing units, processing means and the like may be realized as programs to be executed on a computer, in other words, may be realized as software. Information on programs, tables, files and the like, which realize the individual configurations, functions, processing units, processing means and the like, can be stored in storage devices such as memories, hard disks or SSDs (solid state drives) or the like or storage media such as IC cards, SD cards or DVDs.

The embodiments of the present invention will hereinafter be described in detail based on the drawings. Throughout the drawings that show or illustrate the embodiment, members having the same functions are identified by the same or related designations, and their repeated descriptions will be omitted. It is also to be noted that in the following embodiments, the description of the same or similar parts will not be repeated as a general rule unless specifically needed.

First Embodiment

Figure 1:
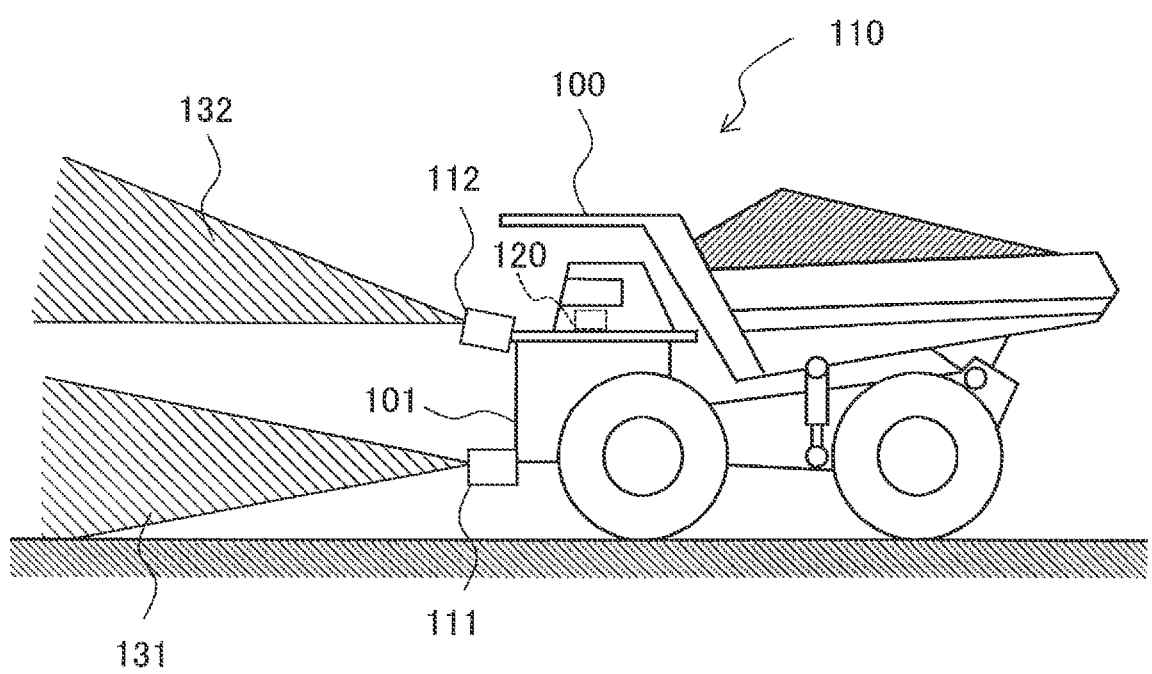
FIG. 1 is a diagram showing the schematic configuration of a dump truck on which one of obstacle detection systems according to a first embodiment of the present invention is mounted.

In the first embodiment, plural obstacle detection devices are mounted as a set at different heights on the front of a dump truck, and on the basis of detection results of these obstacle detection devices, a determination is made as to whether an object is a small vehicle or a large vehicle. With reference to FIG. 1, a description will hereinafter be made about the first embodiment of the present invention. FIG. 1 is a diagram showing the schematic configuration of a dump truck on which one of obstacle detection systems according to the first embodiment of the present invention is mounted.

A mining dump truck (hereinafter simply referred to as "dump truck"; equivalent to a large vehicle) 100 shown in FIG. 1 has a width (for example, 9 m or so) and a height (for example, 7 m or so) far greater than general trucks and buses. On the other hand, light vehicles (equivalent to small vehicles), such as four-wheeled vehicles, often used for management in a mine have a height of approximately a little lower than 2 m. Therefore, the height of the dump truck differs several times the height of each small vehicle. Because vehicles of significantly different heights as described above travel together in a mine, an obstacle detection system is mounted on the dump truck 100 to detect small vehicles.

Described more specifically, the dump truck 100 is provided with plural obstacle detection devices 111,112 and a detection processing device 120 that performs detection processing of an object on the basis of detection results of these obstacle detection devices 111,112. The obstacle detection devices 111,112 and detection processing device 120 are included in the obstacle detection system. The plural obstacle detection devices 111,112 are disposed on the dump truck 100 such that the obstacle detection devices have detection directions oriented in the same direction (forward in this embodiment) in horizontal planes, respectively, and are placed up and down on a vertical line at different locations in an up-and-down direction. The detection processing device 120 detects the size of the object by using these two obstacle detection devices 111,112 as a set and allowing them to cooperate with each other.

In this embodiment, the obstacle detection devices 111, 112 will be described by taking millimeter-wave radar devices as examples. However, the obstacle detection devices 111,112 should not be limited to such millimeter-wave radar devices, and no limitation is imposed on their type insofar as they are obstacle detection devices capable of measuring the distance to an object located in surroundings of the obstacle detection devices. In the following description, the first obstacle detection device 111 disposed on the dump truck 100 at a low location thereof will be called "the lower radar sensor 111", while the second obstacle detection device 112 disposed on the dump truck 100 at a high location thereof will be called "the higher radar sensor 112".

The lower radar sensor 111 is disposed at a height of approximately 2 m from a traveling surface, in other words, at a height comparable to the height of each small vehicle. A detection radar beam emitted from the lower radar sensor 111 is radiated near the ground surface. The lower radar sensor, therefore, has a radiation area (detection area) 131 set near the ground surface, more specifically near a height of 2 m from the traveling surface.

On the other hand, the upper radar sensor 112 is disposed at a height, in which the small vehicle is not detected, in a radiation area (detection area) of the radar sensor. In this embodiment, the lower radar sensor 111 and upper radar sensor 112 are disposed on a structural component 101 in a front section of a body frame of the dump truck 100. For example, the lower radar sensor 111 is disposed on a lower end part of a radiator assembly including a radiator grille, a fixed frame and the like, while the upper radar sensor 112 is disposed on an upper end part of the radiator assembly. In other words, the lower radar sensor 111 and upper radar sensor 112 are disposed up and down on a vertical line with the radiator assembly interposed therebetween. Because the upper part of the radiator assembly, which includes the radiator grille, the fixed frame and the like, is located at a height of 5 m or so from the traveling surface, the upper radar sensor 112 is also disposed at a height of 5 m or so from the traveling surface. When the upper radar sensor 112 is disposed on an upper end of the structural component 101 in the front section of the body frame as shown in FIG. 1, the radar radiation area 132 of the upper radar sensor 112 is, therefore, provided at a relatively high location with respect to the traveling surface as a reference. As this height is at a location higher than an upper end part of the small vehicle, the small vehicle is not included in the radar radiation area 132.

If distances at which detection was made for the object by the radar sensors (hereinafter simply referred to as "detection distances") are progressively checked in the order of the direction of from the lower radar sensor 111 to the upper radar sensor 112, the height of the object can, therefore, be determined to be lower than the height where the upper radar sensor is disposed and the object was no longer detected. Accordingly, the detection processing device 120 determines the object to be a large vehicle if the lower radar sensor 111 and upper radar sensor 112 both detect the object in a detection distance range (hereinafter called "allowable range") where detected objects can be regarded as the same vehicle, and determines the object to be a small vehicle if only the lower radar sensor 111 detects the object in the allowable range.

Figure 2:
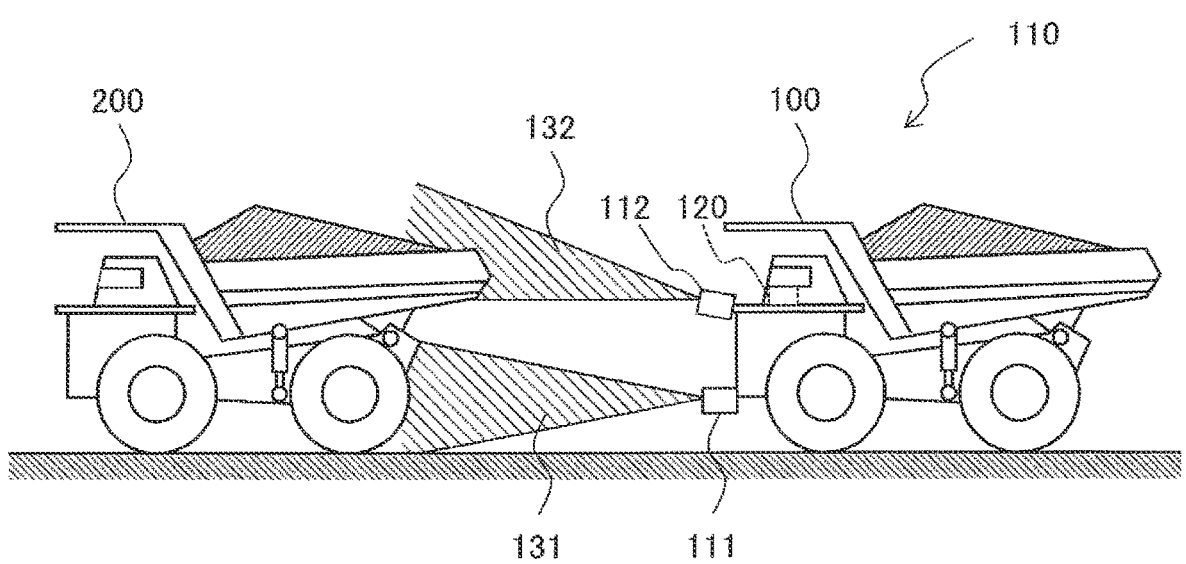
FIG. 2 is a diagram showing a state that a lower radar sensor and an upper radar sensor have both detected an object.
Figure 3:
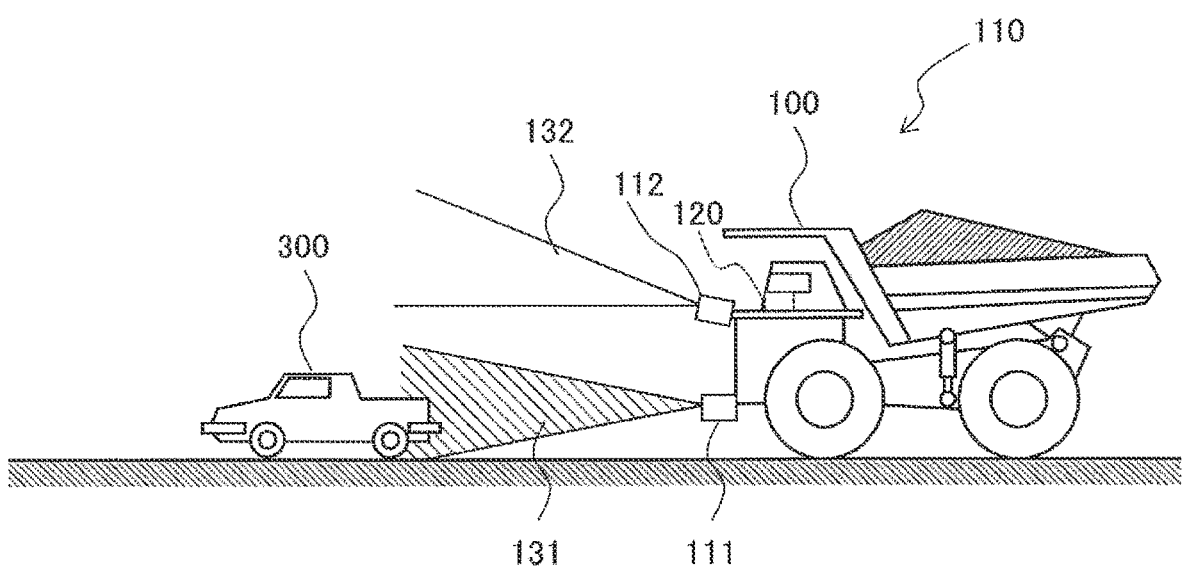
FIG. 3 is a diagram showing a state that only the lower radar sensor has detected an object.

Referring to FIG. 2 and FIG. 3, a description will be made about relationships between the radiation states of the lower radar sensor 111 and upper radar sensor 112 and the sizes (heights) of objects. FIG. 2 is a diagram showing a state that the lower radar sensor and upper radar sensor have both detected the object. FIG. 3 is a diagram showing a state that only the lower radar sensor has detected the object.

When an object 200 is a vehicle as large as the own vehicle (the dump truck 100) as shown in FIG. 2, the lower radar sensor 111 and upper radar sensor 112 both detect the object.

When an object 300 is a small vehicle as shown in FIG. 3, on the other hand, the object 300 is included in the radar radiation area 131 of the lower radar sensor 111 but is not included in the radar radiation area 132 of the upper radar sensor 112. As only the lower radar sensor 111 has detected the object 300, the detection processing device 120 can determine the size (height) of the object 300 to be smaller than the height of the radar radiation area 131 of the upper radar sensor 112 from the traveling surface because only the lower radar sensor 111 has detected the object 300. In this case, the object can be determined to be a small vehicle.

The upper radar sensor 112 and lower radar sensor 111 are mounted at different heights on the dump truck 100. The upper radar sensor 112 may be mounted with an angle of elevation on the dump truck 100 so that the lower-limit radiation line of a detection beam emitted from the upper radar sensor 112 extends substantially in parallel to a horizontal plane. When millimeter-wave radar sensors are used as the lower radar sensor 111 and upper radar sensor 112, each radar sensor has a detection width in the up-and-down direction owing to spreading of the directionality of a radio wave (detection beam) because the radar sensor emits the radio wave to detect the object. If the vertical detection width of the detection beams increases, an area may arise where the detection area of the upper radar sensor 112 and the detection area of the lower radar sensor 111 overlap each other in the up-and-down direction (the height direction). It will then become difficult to discriminate, from the height of the object detected in the overlapping area and from the use of the existence or non-existence of detection by the upper radar sensor 112, whether the object is the large vehicle or the small vehicle.

Therefore, the vertical detection widths of the respective detection beams may desirably be set such that the detection areas of the upper radar sensor 112 and lower radar sensor 111 do not overlap each other in a desired detection distance range (which is set using, as a reference, the position of the dump truck in the horizontal plane, and which will hereinafter be called "target distance determination range) where the object is desired to be detected. The term "target distance determination range" as used herein means, for example, to be near to such an extent that the haulage vehicle can avoid an interference if it begins an interference avoidance maneuver after the detection of the object but not to be far to such an extent that the determination of the need/non-need of an avoidance maneuver is not needed at all even if the object is detected, and can be determined taking the speed, braking distance and the like of the haulage vehicle into consideration.

As an example of the detection width of each millimeter-wave radar sensor, the detection width may be designed such that a radar antenna has, for example, a large gain in an angle range of ±4 degrees or so with respect to the horizontal plane. In this case, the millimeter-wave radar sensor will have a detection area extending primarily over an angle range of ±4 degrees or so in both upward and downward directions.

Different from optical sensors such as laser scanners, the vertical radar detection width will have a certain angle in the case of a sensor that uses a radio wave. The radar radiation area 132 of the upper radar, therefore, progressively increases in vertical width as it becomes farther, and may have a potential problem of eventually overlapping the radar radiation area 131 of the lower radar sensor.

The possibility of detection of the lower object is, therefore, reduced by disposing the upper radar sensor 112 such that it has an angle of elevation while taking the vertical detection angle width as an upper limit. Preferably, the radar sensor or sensors to be arranged above the lowermost radar sensor in a set of obstacle detection devices may each be disposed with an angle of elevation.

More preferably, the upper radar sensor 112 may be disposed such that the lower-limit radiation line of its detection beam extends horizontally. If the upper radar sensor 112 is disposed, for example, at an upward inclination of 4 degrees in the above-described example, the lower-limit radiation line of the detection beam of the upper radar sensor 112 extends in parallel to the horizontal plane so that the radar radiation area 132 of the upper radar sensor 112 is allowed to extend only weakly to a side lower than the horizontal plane. It is, hence, possible to clearly define a detection area for the object.

Owing to the disposing of the upper radar sensor with an angle of elevation on the dump truck as described above, advantageous effects are brought about that the size-dependent discrimination of objects can be facilitated and the detection of the size of each object can be made in a wide zone to a farther distance.

FIG. 1 to FIG. 3 show the state that the upper radar sensor 112 is mounted with an angle of elevation on the dump truck 100. It is, however, still possible to avoid the occurrence of an overlapped range of the detection areas in the height direction by adjusting the difference in height between the upper radar sensor 112 and the lower radar sensor 111 and their detection widths even if they are both oriented in horizontal directions.

Figure 4A:
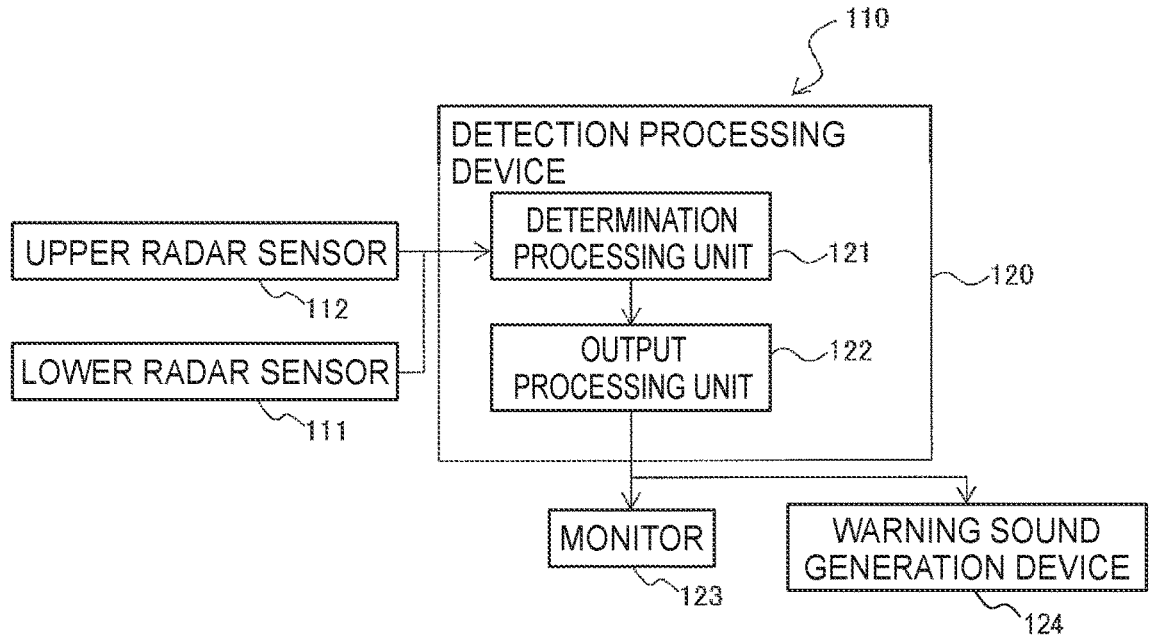
FIGS. 4A and 4B are functional block diagrams illustrating the internal configurations of the obstacle detection systems according to the first embodiment, in which the obstacle detection system of FIG. 4A is to be mounted on a manned dump truck and the obstacle detection system of FIG. 4B is to be mounted on an autonomously traveling dump truck.
Figure 4B:
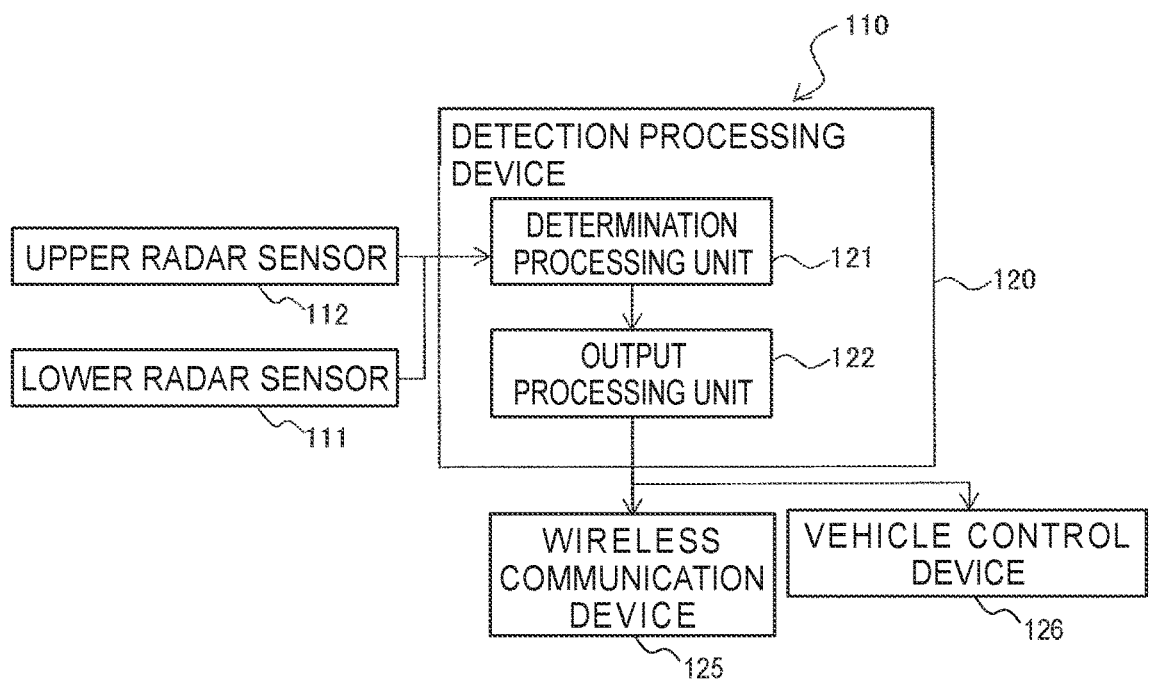

Referring next to FIGS. 4A and 4B, a description will be made about the internal configurations of obstacle detection systems 110 according to this embodiment. FIGS. 4A and 4B are functional block diagrams illustrating the internal configurations of the obstacle detection systems according to this embodiment, in which the obstacle detection system of FIG. 4A is to be mounted on a manned dump truck and the obstacle detection system of FIG. 4B is to be mounted on an autonomously traveling dump truck.

As illustrated in FIG. 4A or 4B, each obstacle detection system 110 includes the detection processing device 120, the lower radar sensor 111, and the upper radar sensor 112. The detection processing device 120 includes a determination processing unit 121 and an output processing unit 122. On the basis of detection results of the lower radar sensor 111 and upper radar sensor 112, the determination processing unit 121 detects an object and determines the size (height) of the object. The output processing unit 122 performs processing for externally outputting determination results of the determination processing unit 121. The detection processing device 120 is configured including hardware, which in turn includes a computing and control unit such as CPU (Central Processing Unit) and storage devices such as ROM (Read Only Memory), RAM (Random Access Memory) and HDD (Hard Disk Drive), and software to be executed by the detection processing device 120. These elements cooperate together, whereby the functions of the detection processing device 120 are realized.

When the dump truck 100 is a manned dump truck that travels in accordance with driving operation by the operator, the output processing unit 122 performs, as illustrated in FIG. 4A, processing to output determination results to a monitor 123, which visually notifies the operator of the determination results, and a warning sound producing device 124, which audibly notifies the operator of the determination results. In FIG. 4A, the monitor 123 and warning sound producing device 124 are both illustrated, but only one of them may be provided.

When the dump truck 100 is an autonomously-traveling dump truck that autonomously travels in accordance with instructions from a traffic control system to which the dump truck 100 is connected via a wireless network, the output processing unit 122 performs, as illustrated in FIG. 4B, processing to transmit detection information, which indicates determination results, to the traffic control system via a wireless communication device 125 mounted on the dump truck 100. In addition, the output processing unit 122 may also output the determination results to a vehicle control device 126 provided on the autonomously-traveling dump truck, and the vehicle control device 126 may perform drive control of a brake system (not illustrated), which is provided on the autonomously-traveling dump truck, with reference to the determination results. Consequently, it makes it possible to perform an interference avoidance maneuver for a small vehicle, which is not a subject of the traffic control by the traffic control system, by using the output results from the detection processing device 120.

Figure 5A:
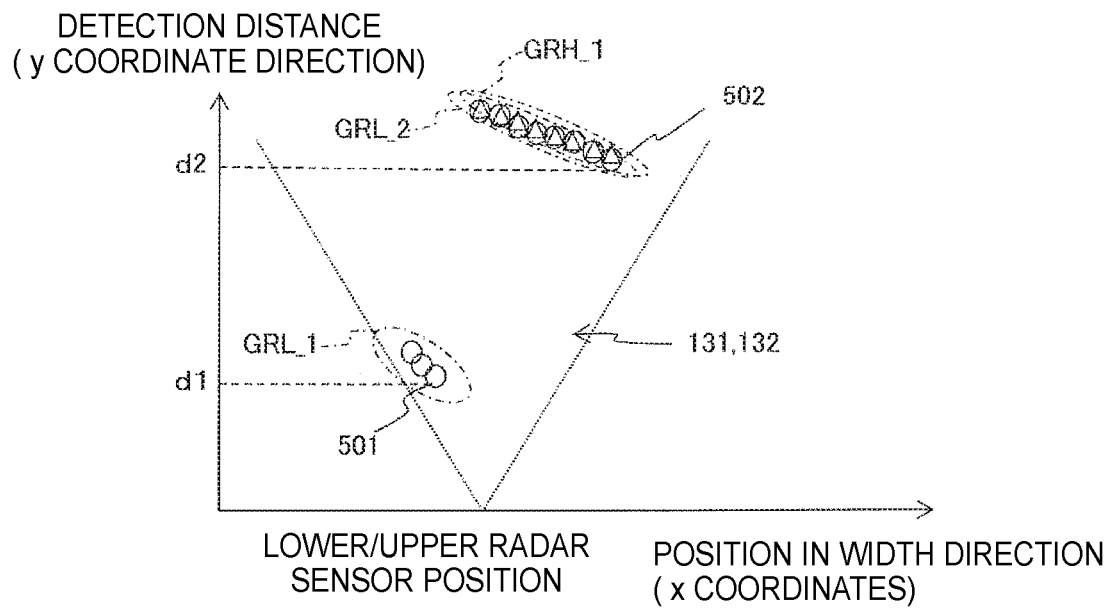
Figure 5B:
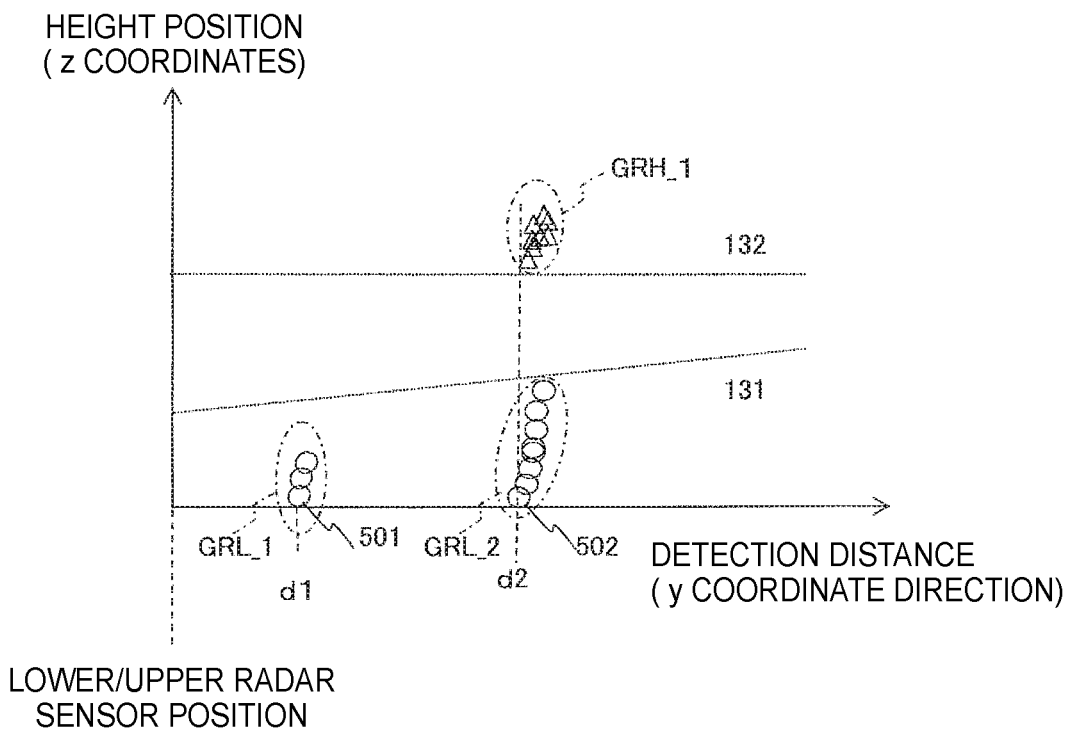
Figure 6:
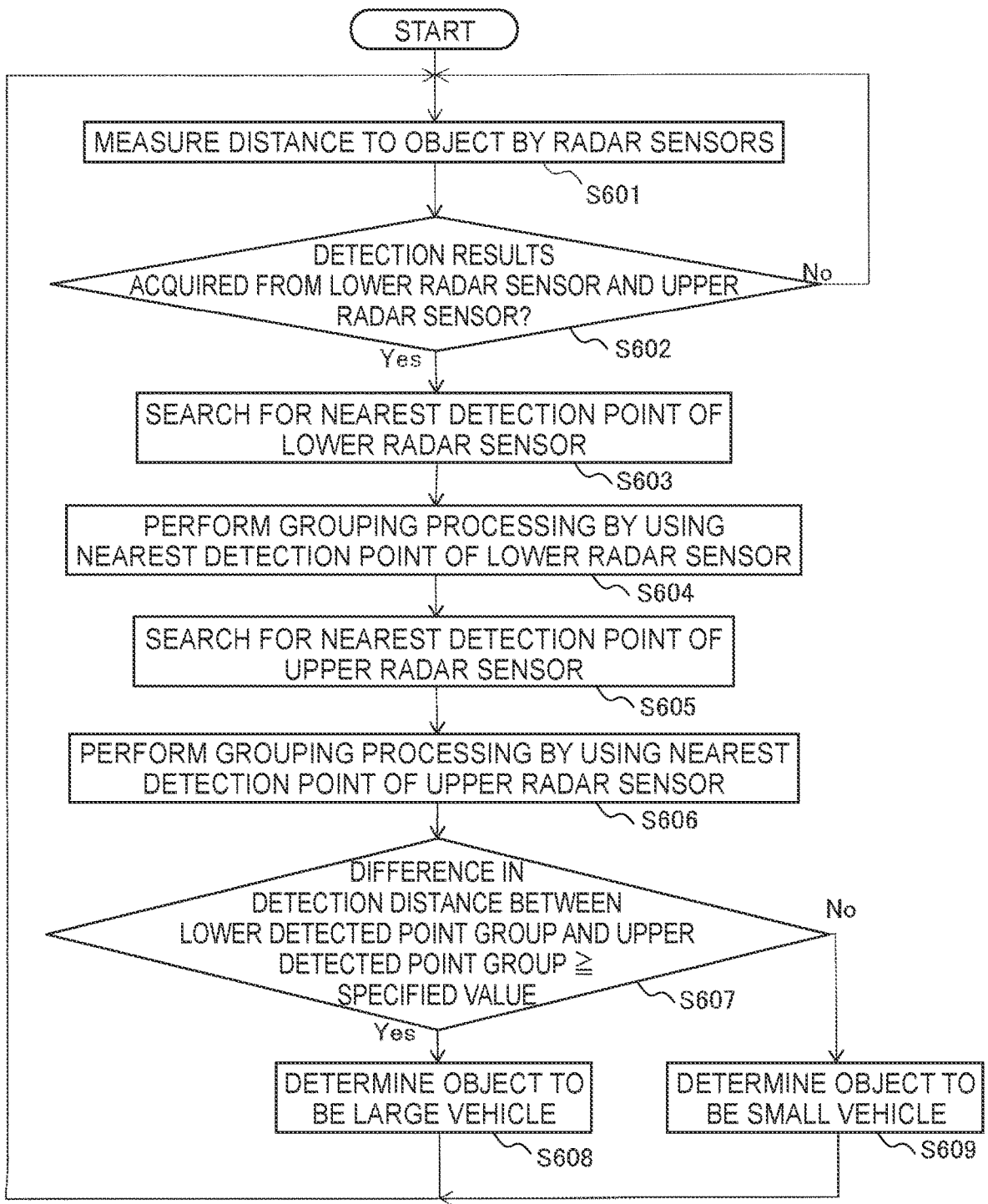
FIG. 6 is a flow chart illustrating the flow of processing by one of the obstacle detection systems according to the first embodiment.

Referring next to FIGS. 5A and 5B, a description will be made about details of processing by one of the obstacle detection systems 110 according to this embodiment. FIGS. 5A and 5B are diagrams illustrating an example of grouping processing, in which FIG. 5A illustrates positions of an object on a horizontal plane and FIG. 5B illustrates positions of the object in a vertical plane. FIG. 6 is a flow chart illustrating the flow of the processing by the obstacle detection system.

With reference to FIGS. 5A and 5B, a description will first be made about processing for the determination of a large vehicle and a small vehicle at the detection processing device 120. In the following description, positions where the lower radar sensor 111 or upper radar sensor 112 detected the object will be called "detection points". In FIGS. 5A and 5B, circles ○ indicate detection points where the lower radar sensor 111 detected the object, while triangles Δ indicate detection points where the upper radar sensor 112 detected the object. Further, in FIGS. 5A and 5B, numeral 501 indicates the point (hereinafter called "nearest detection point") where the detection distance was smallest among the detection points where the lower radar sensor 111 detected the object.

The determination processing unit 121 performs grouping processing that puts different detection points, which are located in a distance range (hereinafter called "allowable range") where detected objects can be regarded as the same vehicle, together as a single group while using the nearest detection point as a reference. This allowable range absorbs errors in detection distance that arise from the shape of the object, jolting of the body frame of the own vehicle during traveling, and so on, and therefore is a distance range to regard that the same vehicle has been detected at different detection points. GRL_1 in each diagram indicates a group of detection points as created using the nearest detection point 501 as a reference. On the other hand, GRL_2 in each diagram indicates a group of detection points not included in GRL_1 as created using, as a reference, a detection point 502 of a short detection distance.

Similarly, GRH_1 in each diagram indicates a group of detection points by the upper radar sensor 112 as created using a nearest detection point as a reference As illustrated in FIG. 5A, the upper radar sensor 112 has not detected the object at detection distances corresponding to GRL_1 on the horizontal plane. At a detection distance d1 indicated by the detection points in GRL_1 as illustrated in FIG. 5B, it is only in the radar radiation area (detection area) of the lower radar sensor 111 that the detection results were obtained in the height direction. In this case, the height of the object is, therefore, lower than the height of the radiation area of the upper radar sensor 112. Although the radiation area of the upper radar sensor 112 at the detection distance d1 can be determined from the vertical angle of the radar sensor through a geometric calculation, the height of the object which the upper radar sensor 112 cannot detect may be determined through simplified processing by regarding it to be lower than the height of the disposed location of the upper radar sensor 112. In this case, the object in GRL_1 can be determined to have a height lower than 5 m. By providing a criterion that a vehicle height of 5 m or higher is discriminated to be a large vehicle and a vehicle height of lower than 5 mm is discriminated to be a small vehicle, the determination processing unit 121 can determine the object in GRL_1 to be the small vehicle.

In FIG. 5A, the upper radar sensor 112 has detected the object, which is indicated by GRL_1, in the allowable range where the object can be regarded to be the same vehicle as the object indicated by GRL_2. In this case, the height of the object is equal to or higher than the disposed position of the upper radar sensor 112 as illustrated in FIG. 5B. The determination processing unit 121, therefore, determines the object to be the large vehicle.

Following the order of the individual steps in FIG. 6, a description will next be made about the flow of processing by one of the obstacle detection systems according to the first embodiment.

When the engine of the dump truck 100 has been started, the lower radar sensor 111 and upper radar sensor 112 begin processing for the measurement of the distance to an object (S601). Respective detection results of the lower radar sensor 111 and upper radar sensor 112 are outputted to the determination processing unit 121 of the detection processing device 120.

Upon acquisition of the detection results from the lower radar sensor 111 and upper radar sensor 112 (S602/Yes), the determination processing unit 121 searches for a nearest detection point in the detection results of the lower radar sensor 111 (S603).

The determination processing unit 121 then puts different detection points, which are located in an allowable range where detected objects can be regarded as the same object, together as a single group while using the nearest detection point as a reference (S604).

The determination processing unit 121 also searches for a nearest detection point with respect to the upper radar sensor 112 (S605), and performs grouping of detection points in an allowable range (S606). Although it has been described to perform steps S605 and S606 after steps S603 and S604 in this embodiment, steps S603 and 604 may be performed after steps S605 and S606. As an alternative, the grouping processing in steps S604 and S606 may be performed (the order of steps S603 and S605 is arbitrary) after the performance of the search for the nearest detection point in steps S603 and S605 (the order of steps S604 and S606 is arbitrary).

The determination processing unit 121 then determines whether or not the difference in detection distance between the detection point group set by using the nearest detection point of the lower radar sensor 111 as the reference (lower detection point group) and the detection point group set by using the nearest detection point of the upper radar sensor 112 as the reference (upper detection point group) is equal to or greater than a specified value (S607). If the difference is equal to or greater than the specified value, in other words, if the upper detection point group is located farther (S607/Yes), the object indicated by the upper detection point group should be an object different from the object indicated by the lower detection point group, or should not have been detected at the height of the lower detection point group. The determination processing unit 121, therefore, determines that the height of the object is lower than the disposed height of the upper radar sensor 112, specifically the object is a large vehicle (S608). The output processing unit 122 externally outputs this determination result.

If the difference in detection distance between the upper detection point group and the lower detection point group is smaller than the specified value (S607/No), on the other hand, it is meant that the object was detected by both the lower radar sensor 111 and the upper radar sensor 112. The determination processing unit 121, therefore, determines that the object has a height as high as the own vehicle, in other words, is a small vehicle (S609). The output processing unit 122 externally outputs this determination result. Subsequently, the processing returns to step S601, and measurements of distances to another object by the lower radar sensor 111 and upper radar sensor 112 are performed again. The above-mentioned processing is then performed on the new detection results. This series of processing is repeated until the engine of the dump truck 100 stops.

According to this embodiment, the plural obstacle detection devices are disposed on the dump truck such that their detection ranges are oriented in the same direction in the horizontal planes, respectively, and the heights of their detection ranges allow to distinguish the small vehicle and the large vehicle from each other in height, and on the basis of the detection results of both the obstacle detection devices, the small vehicle and large vehicle are distinguishably determined. It is, therefore, possible to detect the small vehicle which is different in behavior from the dump truck. Consequently, an interference avoidance maneuver can be conducted for the small vehicle, thereby enabling to provide improved safety when small vehicles and large vehicles travel together in a mine.

Figure 7:
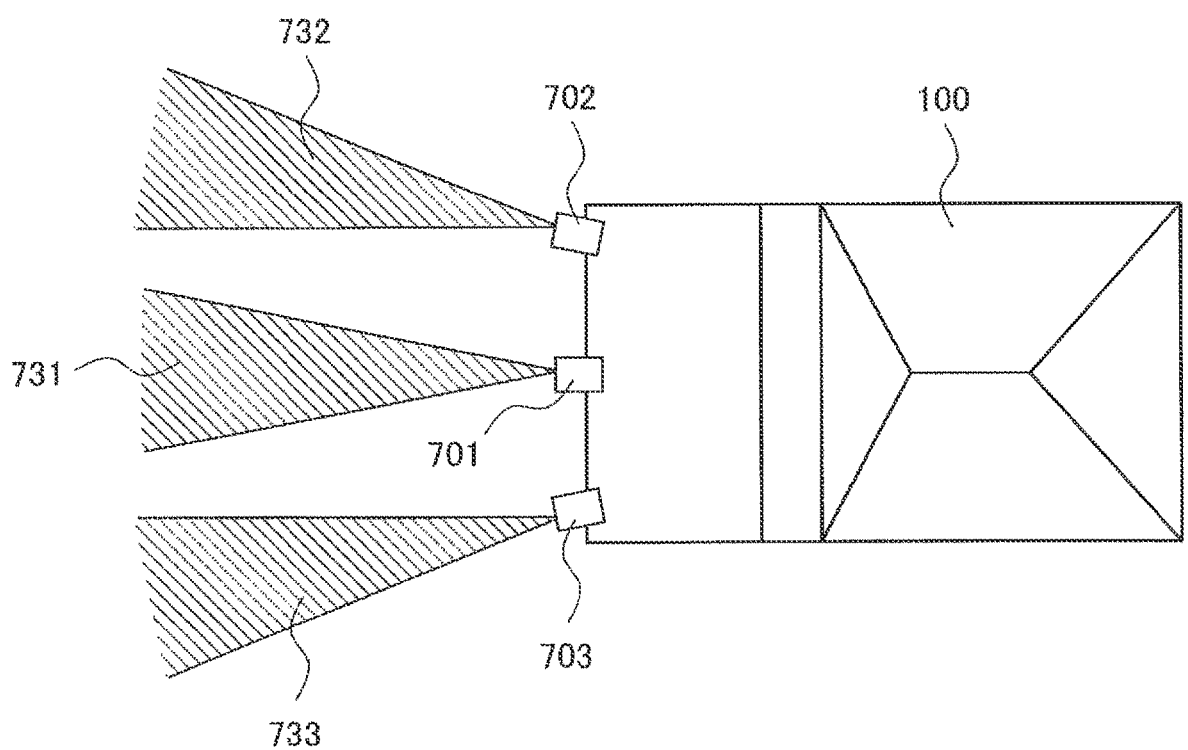
FIG. 7 is a top view of a dump truck, which illustrates a state that plural sets of obstacle detection devices are disposed on the front of the dump truck.

In the above-described first embodiment, the single set of radar sensors is provided on a laterally-central part of the front of the dump truck. However, plural sets of radar sensors may be disposed with lateral intervals in the front of the dump truck to also enable the detection of an obstacle existing not in front of the vehicle, such as an obstacle existing ahead of a curve. With reference to FIG. 7, a description will be made about the modification described above. FIG. 7 is a top view of a dump truck, which illustrates a state that plural sets of obstacle detection devices are disposed on the front of the dump truck.

The dump truck 100 illustrated in FIG. 7 is provided with an upper central radar sensor 701 at a lateral center of the front of the dump truck (a lower radar sensor disposed below the upper central radar sensor 701 is not illustrated), an upper right radar sensor 702 on a right end part of the front of the dump truck, and an upper left radar sensor 703 on a left end part of the front of the dump truck (lower radar sensors disposed below the upper right radar sensor 702 and upper left radar sensor 703, respectively, are not illustrated). Numerals 731, 732 and 733 indicate the respective detection areas of the upper central radar sensor 701, upper right radar sensor 702 and upper left radar sensor 703. With respect to each set of radar sensors, the above-described processing of FIG. 6 can be repeated.

The disposing of the paired radar sensors on each of the left and right end parts of the front of the dump truck has led to the addition of the radar radiation areas 732,733 so that a wider area can be detected.

Second Embodiment

A second embodiment determines the type of an object on the basis of detection results of obstacle detection devices. In the second embodiment, similar elements and processing steps as in the first embodiment will be designated by the same signs as the signs used in the description of the first embodiment, and their description will be omitted.

Figure 8A:
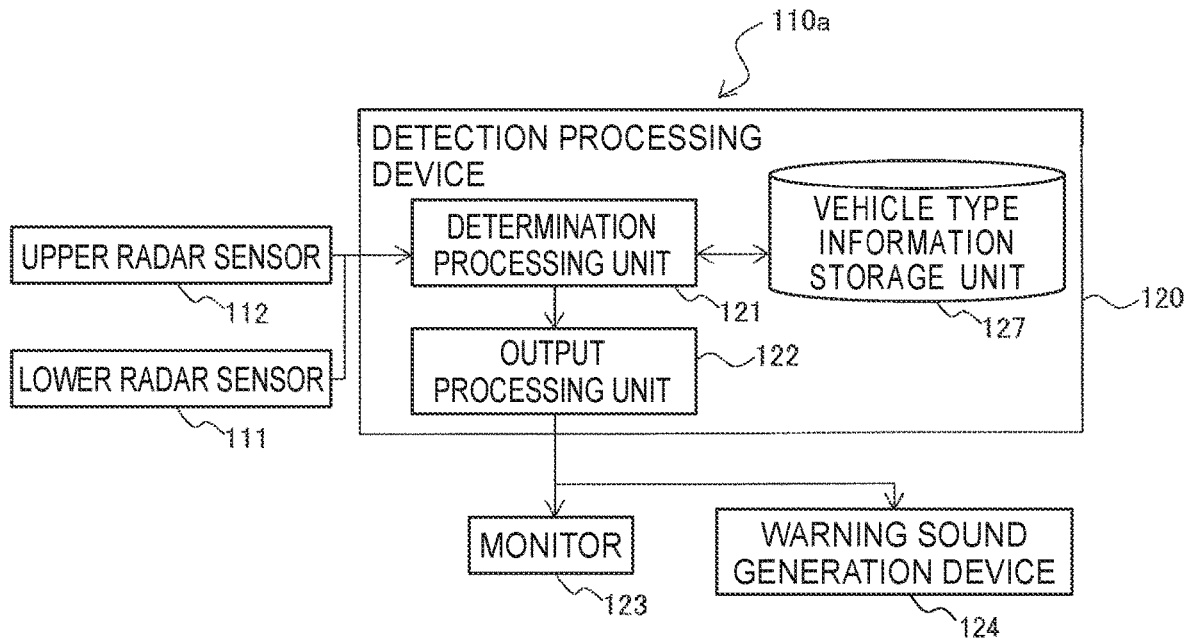
FIGS. 8A and 8B are functional block diagrams illustrating the internal configurations of obstacle detection systems according to a second embodiment, in which the obstacle detection system of FIG. 8A is to be mounted on a manned dump truck and the obstacle detection system of FIG. 8B is to be mounted on an autonomously traveling dump truck.
Figure 8B:
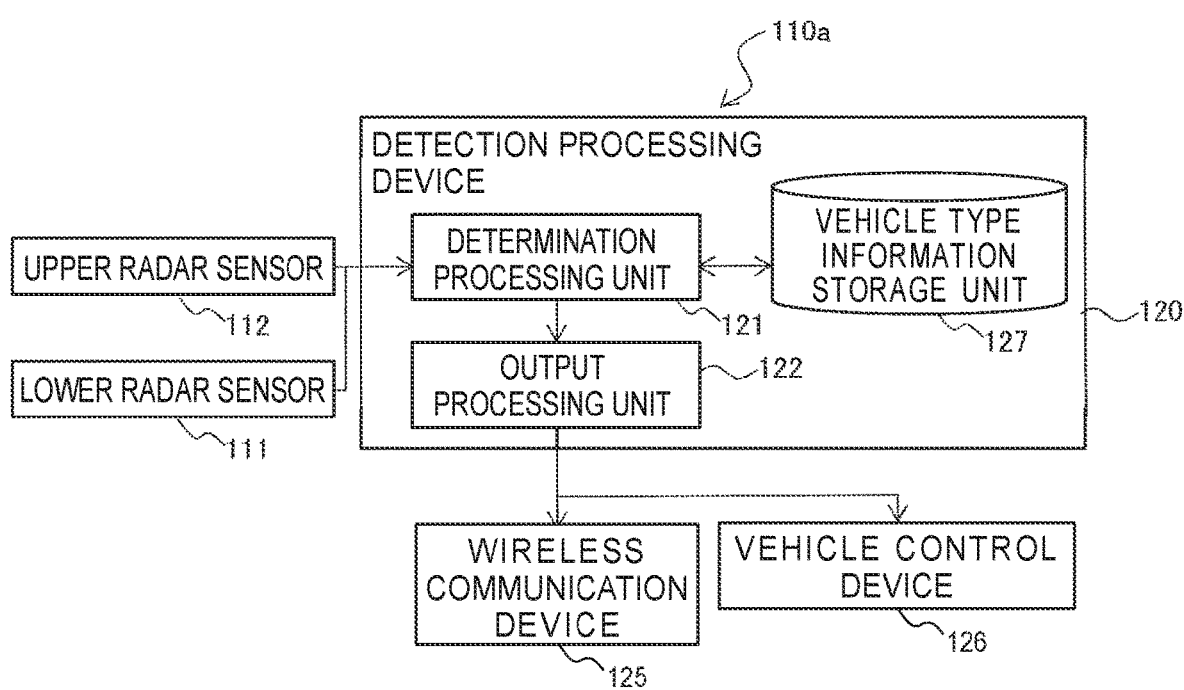

FIGS. 8A and 8B are functional block diagrams illustrating the internal configurations of obstacle detection systems according to the second embodiment, in which the obstacle detection system of FIG. 8A is to be mounted on a manned dump truck and the obstacle detection system of FIG. 8B is to be mounted on an autonomously traveling dump truck.

Each obstacle detection system 110a according to the second embodiment includes, in addition to the configuration of the corresponding obstacle detection system 110 according to the first embodiment, a vehicle type information storage unit 127 that stores vehicle type information in which the types and heights of vehicles as candidates for objects are correlated. With reference to FIG. 9, a description will be made about an example of vehicle type information. FIG. 9 is a table showing vehicle type information to be stored in the vehicle type information storage unit.

Figure 10:
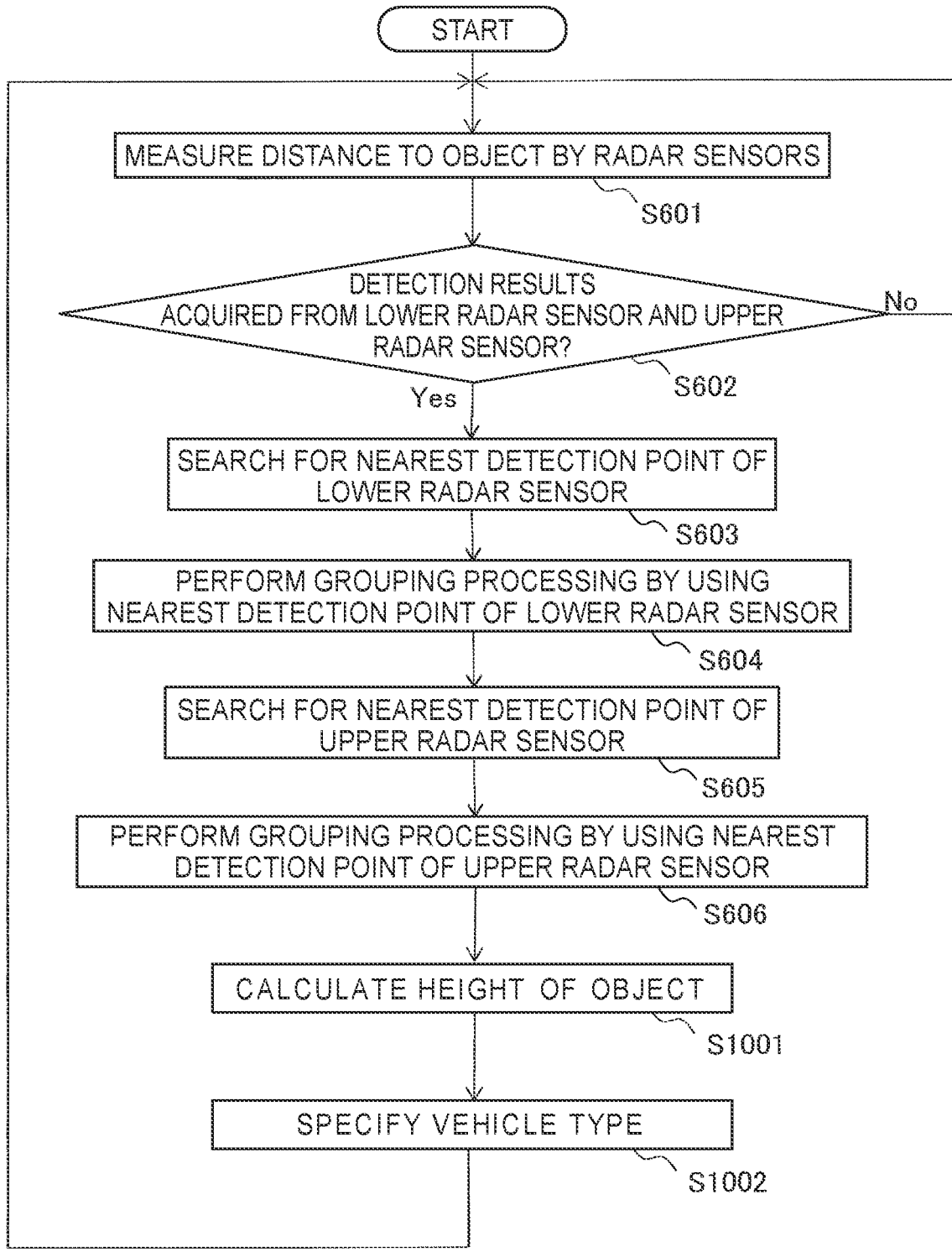
FIG. 10 is a flow chart illustrating the flow of processing by one of the obstacle detection systems according to the second embodiment.

In the vehicle type table 900 illustrated in FIG. 9, three vehicle types and the heights of the respective vehicle types are associated and stored. Vehicle type 1 is assumed, for example, to be used as a navigation survey vehicle and to have a height h1 of a value lower than 2 m. Vehicle type 2 is assumed, for example, to be a sprinkler vehicle and to have a height h2 of a value equal to or greater than 2 m but smaller than 5 m. Vehicle type 3 is assumed, for example, to be a haulage vehicle using a large dump truck and to have a height h3 of a value equal to or greater than 5 m. The determination processing unit 121 determines the type of each object by using this vehicle type table 900. With reference to FIG. 10, a description will hereinafter be made about processing for the determination of an object by the second embodiment. FIG. 10 is a flow chart illustrating the flow of processing by one of the obstacle detection systems according to the second embodiment.

In the second embodiment, the processing of from step S601 to step S606 in the first embodiment is also performed. The determination processing unit 121 then calculates the height of the object by scanning the detection results in a height direction in the order of the lower detection point group created in step S604 and the upper detection point group created in step S606 (S1001). The determination processing unit 121 then specifies the vehicle type of the obstacle by collating the vehicle type table 900 and the calculated vehicle height (S1002). The output processing unit 122 externally outputs the specified result.

According to this embodiment, it is possible not only to distinguish large vehicles and small vehicles from each other but also to allow the haulage vehicle to take measures corresponding to dynamic characteristics that differ depending on the vehicle types even among the small vehicles. For example, when a light vehicle and a sprinkler vehicle, which use four-wheeled vehicles, are included in the small vehicles, the light vehicle has higher dynamic performance than the sprinkler vehicle so that the light vehicle may perform a sudden stop or a sudden turn. The haulage vehicle can, therefore, take an earlier response such that it begins a preparation for an interference avoidance maneuver.

Third Embodiment

Figure 11:
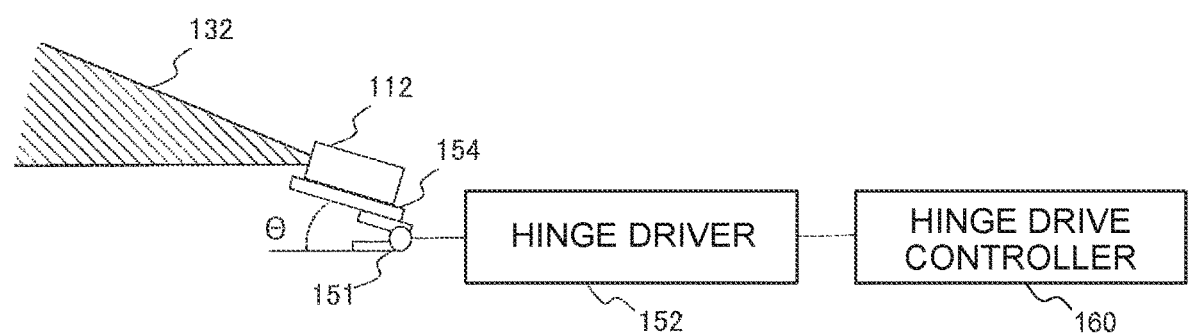
FIG. 11 is a diagram illustrating the schematic configuration of an elevation angle changing mechanism.
Figure 12:
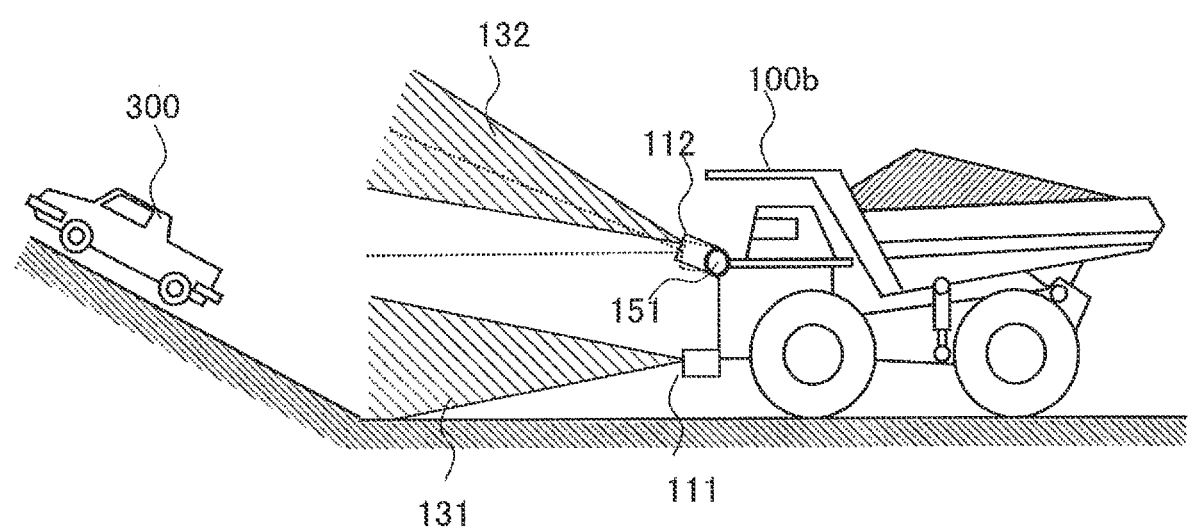
FIG. 12 is a diagram illustrating the mounting angles of the obstacle detection devices included in one of obstacle detection systems according to a third embodiment.
Figure 13A:
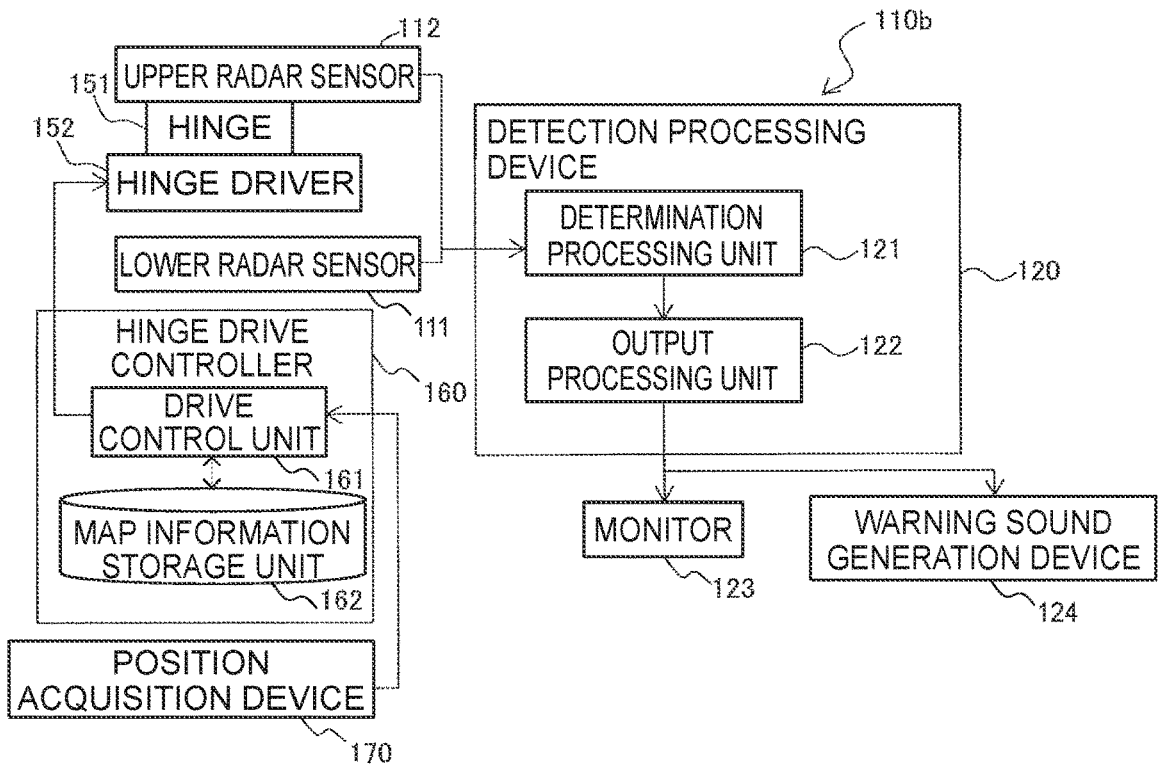
FIGS. 13A and 13B are functional block diagrams illustrating the internal configurations of the obstacle detection systems according to the third embodiment, in which the obstacle detection system of FIG. 13A is to be mounted on a manned dump truck and the obstacle detection system of FIG. 13B is to be mounted on an autonomously traveling dump truck. A diagram showing the arrangement of radar sensors in an obstacle detection system as an embodiment of the present invention.
Figure 13B:
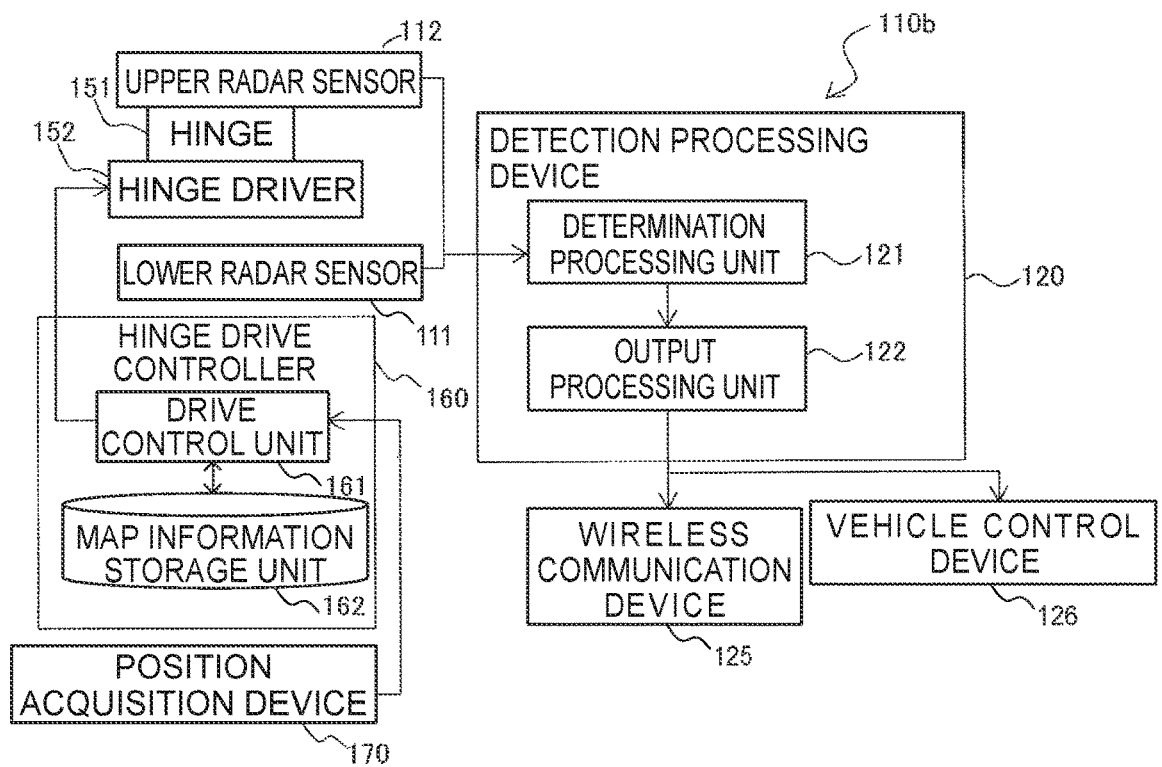

A third embodiment attaches the upper radar sensor such that the angle of attachment (the angle of elevation) is changeable. With reference to FIGS. 11 to 13B, a description will hereinafter be made about the third embodiment. FIG. 11 is a diagram illustrating the schematic configuration of an elevation angle changing mechanism. FIG. 12 is a diagram illustrating the mounting angles of the obstacle detection devices included in each of obstacle detection systems according to the third embodiment. FIGS. 13A and 13B are functional block diagrams illustrating the internal configurations of the obstacle detection systems according to the third embodiment, in which the obstacle detection system of FIG. 13A is to be mounted on a manned dump truck and the obstacle detection system of FIG. 13B is to be mounted on an autonomously traveling dump truck.

Each obstacle detection system 110b according to the third embodiment includes the elevation angle changing mechanism configured to change the angle of elevation of the upper radar sensor 112. As illustrated in FIG. 11, this elevation angle changing mechanism has a base plate 154 with the upper radar sensor 112 attached thereto, a hinge 151 secured to an end of the base plate 154, and a hinge driver 152 composed of a stepping motor as a driver configured to pivot the base plate in the up-and-down direction about the hinge 151 as a fulcrum. The angle of elevation, θ, of the upper radar sensor 112 can be changed to a desired angle by adjusting the number of pulses to be outputted from a hinge drive controller 160. Consequently, the radar radiation area 132 of the upper radar sensor 112 can be positioned farther by changing the radar radiation area 132 of the upper radar sensor 112 upwards relative to an area indicated by broken lines. Further, the height of an object can be detected more specifically by allowing a detection beam to scan in the height direction by changing the angle of elevation of the upper radar sensor 112 when the object has been detected by the upper radar sensor 112.

If there is an ascending road ahead of a dump truck 100b as illustrated in FIG. 12, the upper radar sensor 112 may detect even a small vehicle, which is small in size, depending on the detection distance, and the determination processing unit 121 may hence misidentify it as a large dump truck. Even in such a situation, the above-described problem can be avoided, for example, by providing information, such as a gradient map of a haul road in a mine, beforehand and adjusting the angle of elevation of the upper radar sensor 112 according to the degree of the gradient of the forward haul road.

Referring next to FIGS. 13A and 13B, a description will be made about the internal configuration of the hinge drive controller 160. As illustrated in FIGS. 13A and 13B, the hinge drive controller 160 includes a drive control unit 161 and a map information storage unit 162. The drive control unit 161 output a control signal to the hinge driver 152, and the map information storage unit 162 stores map information on a haul road along which the dump truck 100b travels. The hinge drive controller 160 is configured including hardware, which in turn includes a computing and control unit such as CPU and storage devices such as ROM, RAM and HDD, and software to be executed by the detection processing device 120. These elements cooperate together, whereby the functions of the detection processing device 120 are realized.

The drive control unit 161 is electrically connected to the map information storage unit 162 and a position acquisition device 170. The drive control unit 161 acquires information of the current position of the dump truck 100 from the position acquisition device 170, reads the gradient of a road surface, on which the haulage vehicle is currently traveling, with reference to the map information (in which position coordinates and road gradients are described) in the map information storage unit 162, and calculates the opening of the hinge 151 such that the angle of elevation increases as the upward gradient becomes larger but decreases as the upward gradient becomes smaller. The drive control unit 161 then outputs an instruction signal (pulses) to the hinge driver 152 to change the opening of the hinge 151 according to the calculated value.

As described above, it is possible according to this embodiment to further reduce the effect of the gradient of a road surface on the accuracy of detection of the height of an object by making the angle of elevation of the upper radar sensor adaptively changeable according to the gradient. As a result, the size-dependent precise discrimination of objects can be facilitated irrespective of the gradient of a road surface, whereby small vehicles can be precisely detected even on a gradient road.

Figure 14:
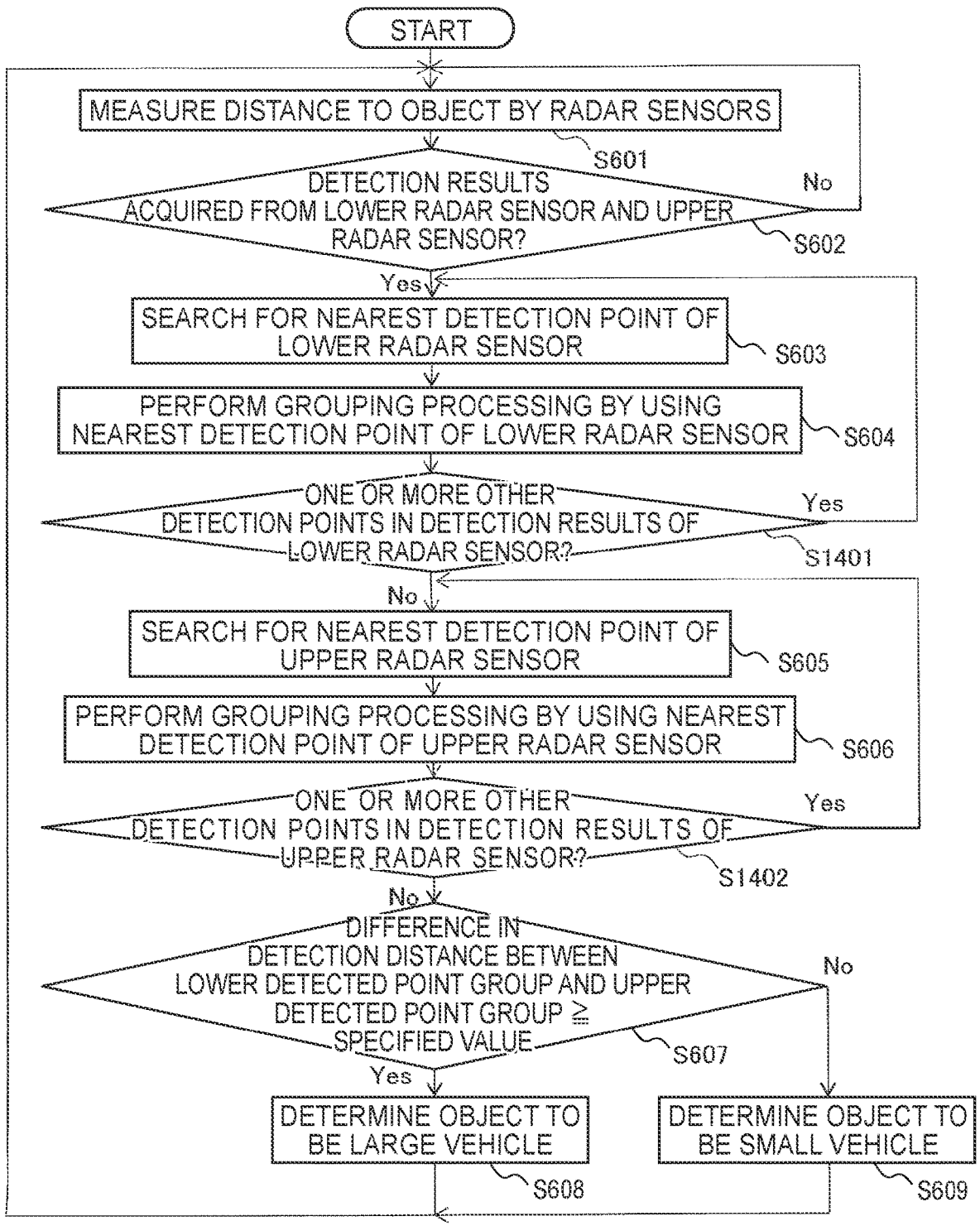
FIG. 14 is a flow chart illustrating the flow of processing by an obstacle detection system according to a further embodiment.

Although the embodiments for carrying out the present invention have been described above, the specific configurations of the present invention shall not be limited only to the individual embodiments described above, and any design modifications and the like within the scope not departing from the spirit of the present invention shall be included in the present invention. For example, in the above-described embodiments, the discrimination of a large vehicle or small vehicle was performed with respect to an object nearest to a dump truck (the first embodiment) or the identification of a vehicle type was performed (the second embodiment) by conducting only a comparison between a lower detection point group and an upper detection point group set by using, as references, nearest detection points of the lower radar sensor and upper radar sensor. However, it is possible to perform grouping with respect to all detection points covered by the upper radar sensor and lower radar sensor, and to perform the discrimination of large vehicles and small vehicles or the identification of their vehicle types on the basis of the results of the grouping, specifically using all objects, which have been detected by the upper radar sensor and lower radar sensor, as targets. About this example of processing, a description will be made with reference to FIG. 13. FIG. 14 is a flow chart illustrating the flow of processing by an obstacle detection system according to a further embodiment.

As illustrated in FIG. 14, if one or more other detection points different from a nearest detection point are included in detection results of the lower radar sensor after the execution of the processing of step S601 to step S604 described above (S1401/Yes), the processing returns to step S603 and, after search is next made for a detection point near the dump truck (S604), grouping processing is performed (S604). This processing is repeated until the detection results of the lower radar sensor contain no ungrouped detection point any longer (S1401/No), and the processing of steps S605 and S606 is performed.

If one or more other detection points different from a nearest detection point are included in detection results of the upper radar sensor after the execution of the processing of step S606 (S1402/Yes), the processing returns to step S605 and, after search is next made for a detection point near the dump truck, grouping processing is performed (S606). This processing will be repeated until the detection results of the upper radar sensor contain no ungrouped detection point any longer (S1402/No).

In the determination processing of step S607, determination is made as to the existence or non-existence of an upper detection point group having a difference of a specified value or greater in detection distance with respect to all the lower detection point group. If any (S607/Yes), the object is determined to be a large vehicle (S608). If not (S607/No), the object is determined to be a small vehicle (S609). In this manner, the discrimination of a large vehicle or a small vehicle can be performed with respect to each of objects detected by the lower radar sensor and upper radar sensor. It is to be noted that the specification of a vehicle type can be conducted for all objects by adding steps S1401 and S1402 to the processing of FIG. 10.

LEGENDS

100 Dump truck
111 Lower radar sensor
112 Upper radar sensor
131 Radiation area of lower radar sensor
132 Radiation area of upper radar sensor
200 Preceding dump truck (large vehicle)
300 Preceding small vehicle

The invention claimed is:

1. An obstacle detection system to be mounted on a haulage vehicle for a mine, comprising:
a first obstacle detection device disposed on the haulage vehicle and configured to measure a distance to an object,
a second obstacle detection device configured to measure a distance to the object, said second obstacle detection device being disposed on the haulage vehicle at a location higher than a location at which the first obstacle detection device is disposed,
a determination processing unit programmed to determine, on a basis of detection results of the first obstacle detection device and the second obstacle detection device, whether the object is a small vehicle with a relatively small body frame or is a large vehicle with a relatively large body frame, and
an output processing unit programmed to externally output results of the determination,
wherein the first obstacle detection device and the second obstacle detection device are disposed at different heights on the haulage vehicle so that the first obstacle detection device and the second obstacle detection device have detection directions oriented in a same direction in horizontal planes, respectively, and have detection areas not overlapping each other in a vertical plane in a target distance determination range from the haulage vehicle, in which the large vehicle and the small vehicle are desired to be distinguishably determined, and
wherein the determination processing unit determines the object to be the large vehicle when the second obstacle detection device has also detected the object in an allowable range in which a same vehicle can be regarded to have been detected at different detection points set by using, as a reference, a detection point where the first obstacle detection device has detected the object, and but determines the object to be the small vehicle when the second obstacle detection device has not detected the object in the allowable range set by using, as the reference, the detection point where the first obstacle detection device has detected the object.

2. The obstacle detection system according to claim 1, wherein:
the second obstacle detection device is disposed on the haulage vehicle with an angle of elevation relative to the corresponding horizontal plane.

3. The obstacle detection system according to claim 2, wherein:
the second obstacle detection device comprises a sensor configured to emit a detection beam and to receive a reflection wave, which has been generated as a result of hitting of the object with the detection beam, thereby measuring the distance to the object, and the detection beam of the second obstacle detection device has a radiation width in an up-and-down direction, and the second obstacle detection device is disposed on the haulage vehicle with the angle of elevation so that the detection beam has a lower-limit radiation line extending in parallel to the corresponding horizontal plane.

4. The obstacle detection system according to claim 2, further comprising:
an elevation angle changing mechanism configured to change the angle of elevation of the second obstacle detection device, and
a drive controller configured to output an elevation angle changing instruction signal to the elevation angle changing mechanism.

5. The obstacle detection system according to claim 1, further comprising:
a vehicle type information storage unit configured to store vehicle type information in which types and heights of vehicles, each of which can become a target to be detected as the object, are correlated with each other,
wherein the determination processing unit is programmed to compare the detection results of the first and second obstacle detection devices and to determine the vehicle type of the object.

6. A haulage vehicle configured to travel in a mine, comprising:
an obstacle detection system to be mounted on the haulage vehicle comprising;
a first obstacle detection device disposed at a first location on the haulage vehicle and configured to measure a distance to an object,
a second obstacle detection device disposed at a second location higher than the first location on the haulage vehicle and configured to measure a distance to the object,
a determination processing unit programmed to determine, on a basis of detection results of the first obstacle detection device and the second obstacle detection device, whether the object is a small vehicle with a relatively small body frame or is a large vehicle with a relatively large body frame, and
an output processing unit programmed to externally output results of the determination,
wherein the first and second obstacle detection devices are disposed to have detection directions oriented in a same direction in horizontal planes, respectively, and are disposed at different heights on the haulage vehicle so that the first obstacle detection device and the second obstacle detection device have detection areas not overlapping each other in a vertical plane in a target distance determination range from the haulage vehicle, in which the large vehicle and the small vehicle are desired to be distinguishably determined, and
wherein the determination processing unit determines the object to be the large vehicle when the second obstacle detection device has also detected the object in an allowable range in which a same vehicle can be regarded to have been detected at different detection points set by using, as a reference, a detection point where the first obstacle detection device has detected the object, and determines the object to be the small vehicle when the second obstacle detection device has not detected the object in the allowable range set by using, as the reference, the detection point where the first obstacle detection device has detected the object.

* * * * *